Oct. 15, 1940.  H. W. PRICE  2,218,136
MONITOR CONTROL GEAR SHIFT
Filed Dec. 21, 1936   12 Sheets-Sheet 1

INVENTOR
HAROLD W. PRICE
BY H. O. Clayton
ATTORNEY

Oct. 15, 1940.  H. W. PRICE  2,218,136

MONITOR CONTROL GEAR SHIFT

Filed Dec. 21, 1936  12 Sheets-Sheet 2

INVENTOR
HAROLD W. PRICE
BY H. C. Clayton
ATTORNEY

INVENTOR
HAROLD W. PRICE
BY H.O. Clayton
ATTORNEY

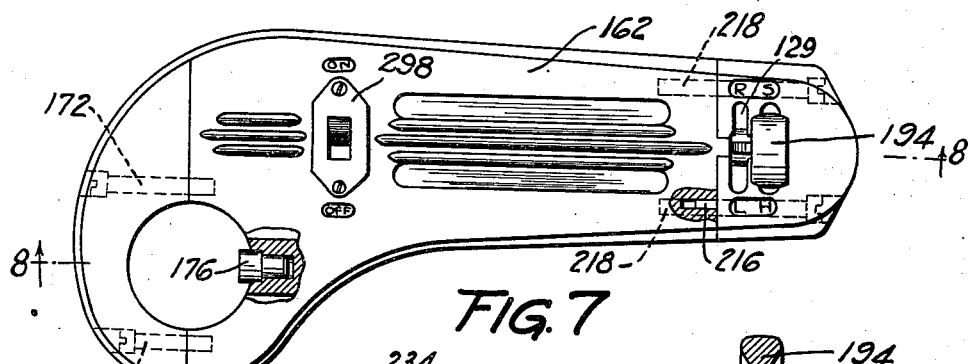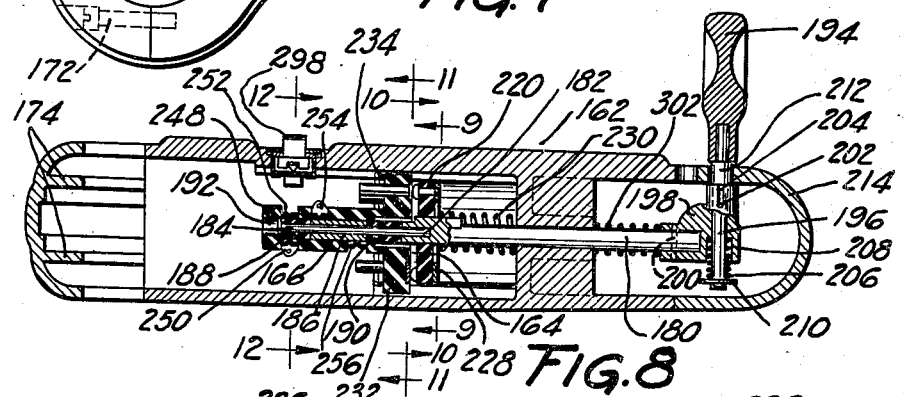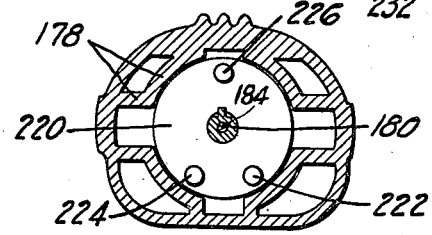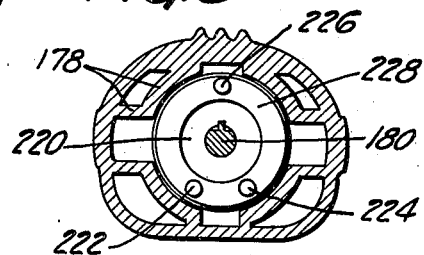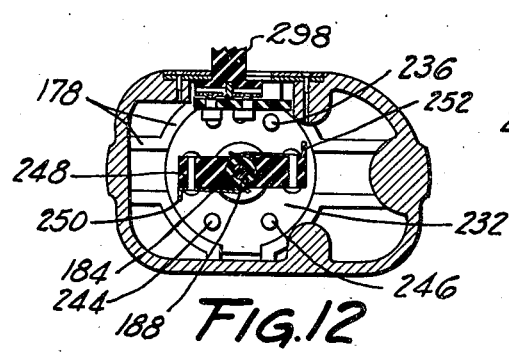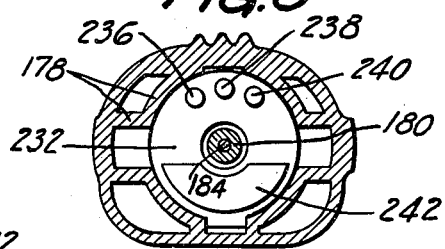

Oct. 15, 1940.  H. W. PRICE  2,218,136

MONITOR CONTROL GEAR SHIFT

Filed Dec. 21, 1936  12 Sheets-Sheet 6

INVENTOR
HAROLD W. PRICE
BY H.O.Clayton
ATTORNEY

Oct. 15, 1940.  H. W. PRICE  2,218,136
MONITOR CONTROL GEAR SHIFT
Filed Dec. 21, 1936  12 Sheets-Sheet 7
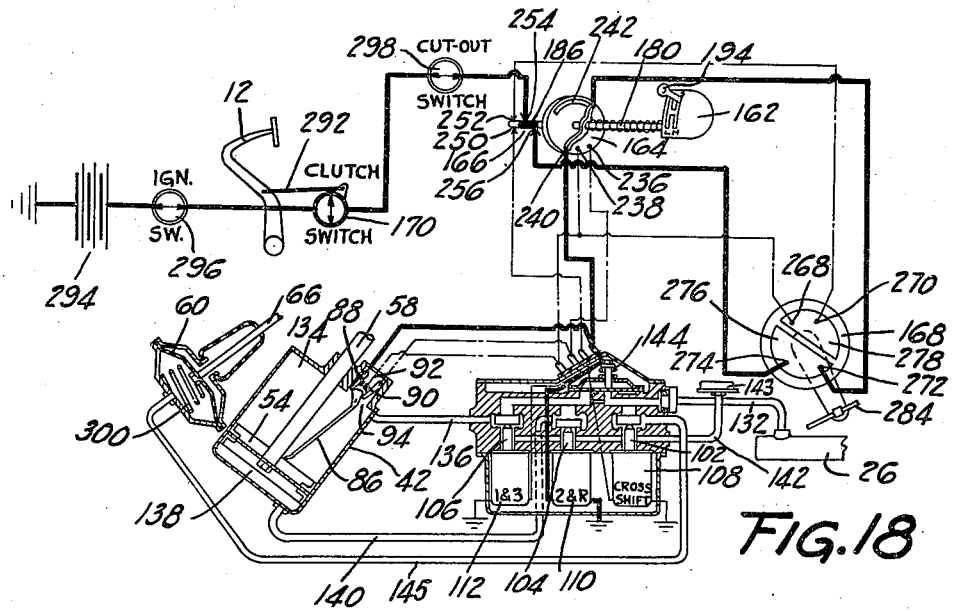
FIG. 18
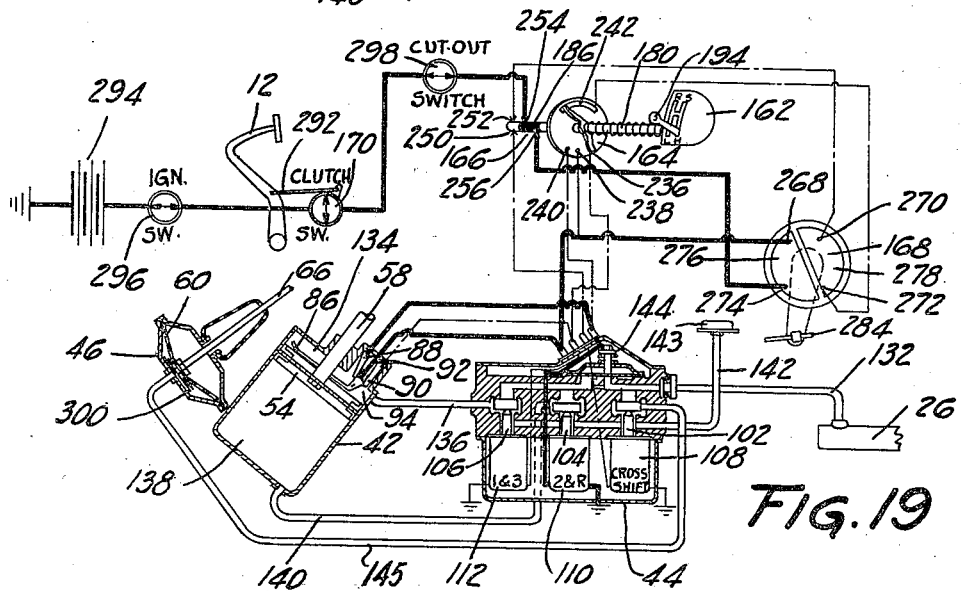
FIG. 19
FIG. 20
INVENTOR
HAROLD W. PRICE
BY
ATTORNEY Oct. 15, 1940.    H. W. PRICE    2,218,136
MONITOR CONTROL GEAR SHIFT
Filed Dec. 21, 1936    12 Sheets-Sheet 8
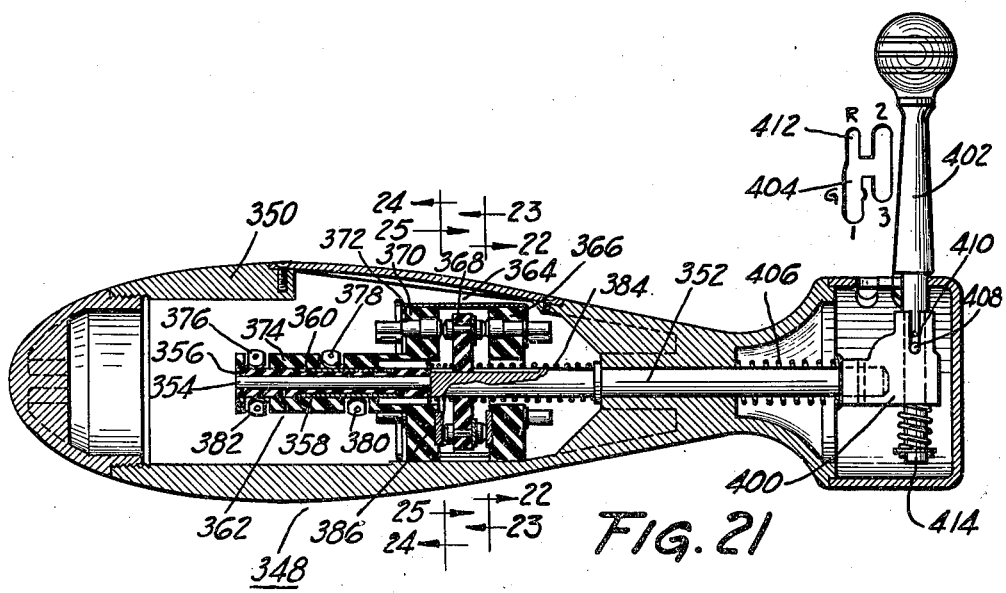
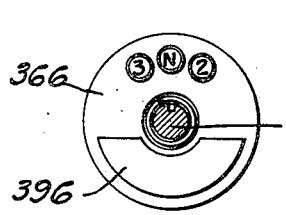
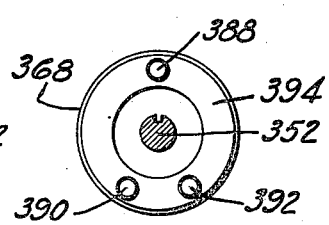
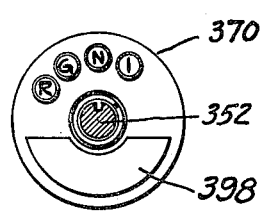
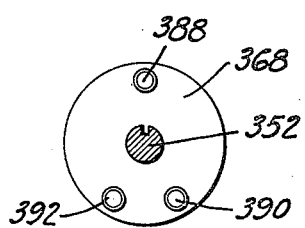
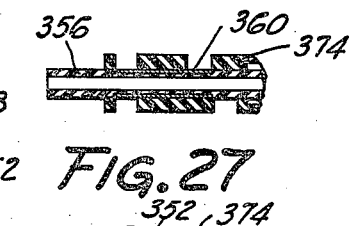
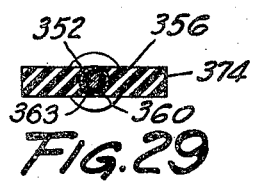
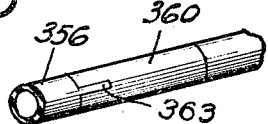
INVENTOR
HAROLD W. PRICE
BY
H. Q. Clayton
ATTORNEY Oct. 15, 1940.  H. W. PRICE  2,218,136
MONITOR CONTROL GEAR SHIFT
Filed Dec. 21, 1936  12 Sheets—Sheet 9
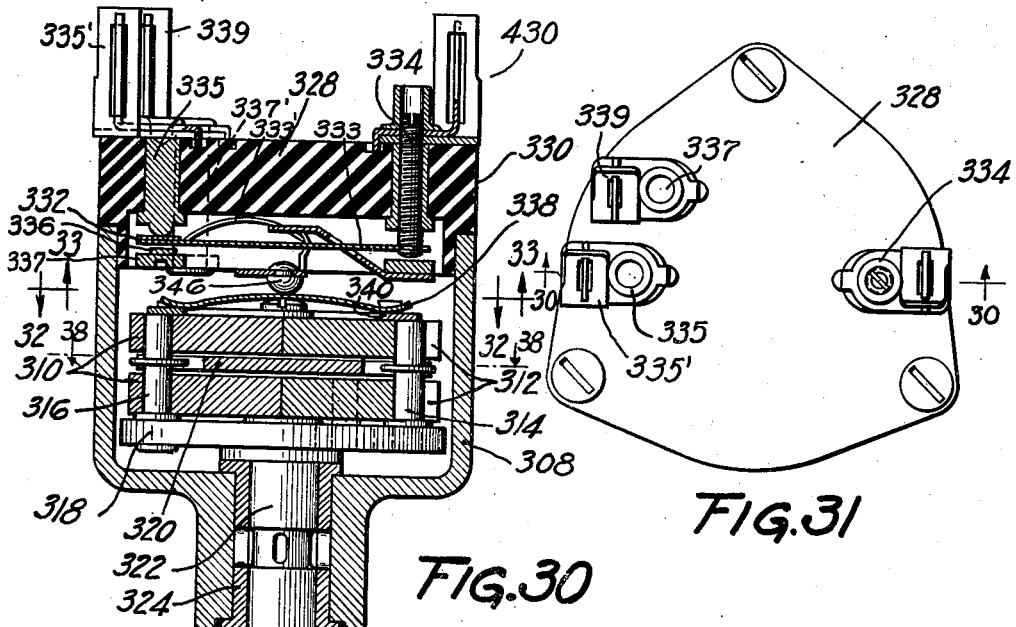
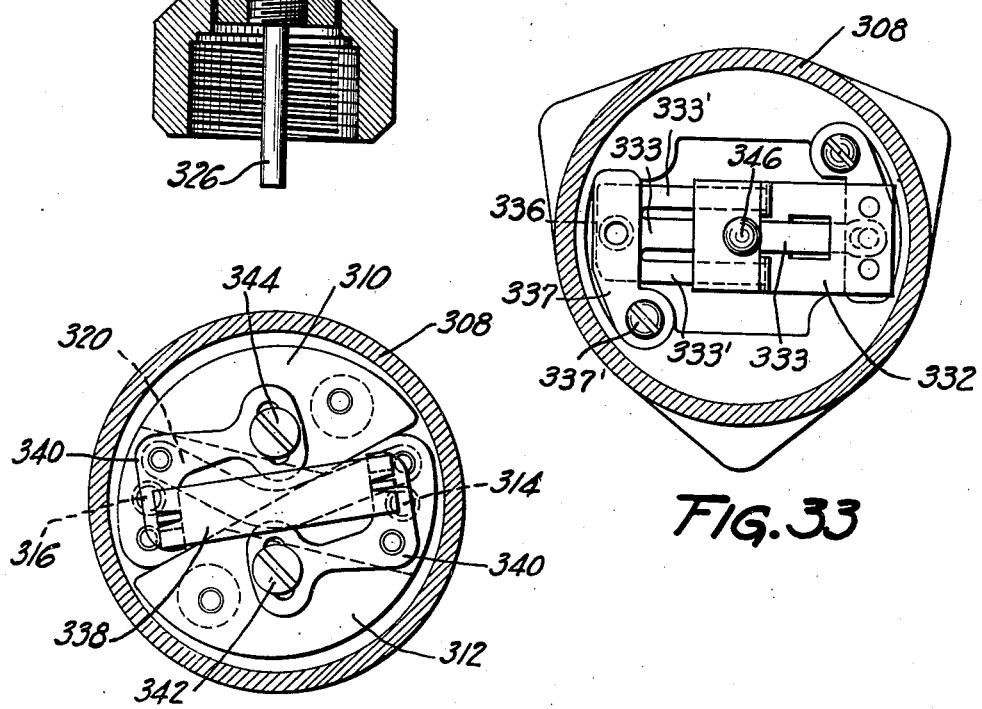
INVENTOR
HAROLD W. PRICE
BY H.O. Clayton
ATTORNEY Oct. 15, 1940.   H. W. PRICE   2,218,136
MONITOR CONTROL GEAR SHIFT
Filed Dec. 21, 1936   12 Sheets-Sheet 10
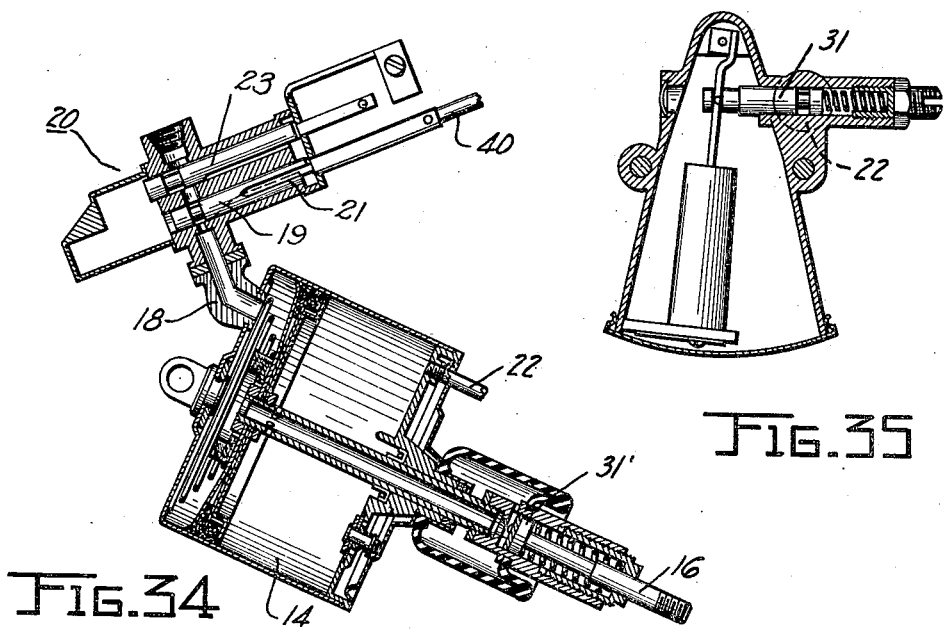
FIG. 35
FIG. 34
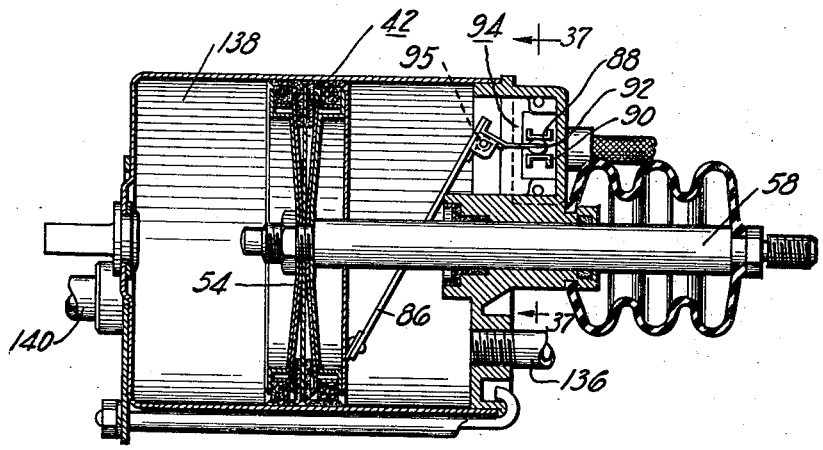
FIG. 36
INVENTOR
HAROLD. W. PRICE
BY
ATTORNEY Oct. 15, 1940. H. W. PRICE 2,218,136
MONITOR CONTROL GEAR SHIFT
Filed Dec. 21, 1936 12 Sheets-Sheet 11

INVENTOR
HAROLD W. PRICE
BY
ATTORNEY

Oct. 15, 1940.   H. W. PRICE   2,218,136
MONITOR CONTROL GEAR SHIFT
Filed Dec. 21, 1936   12 Sheets-Sheet 12
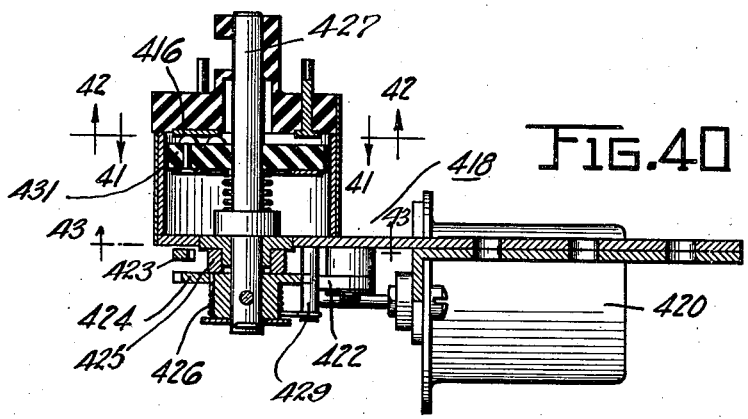
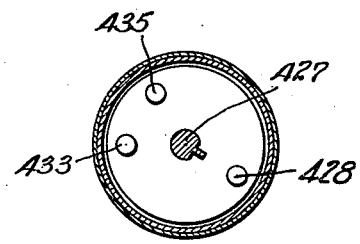
FIG.41
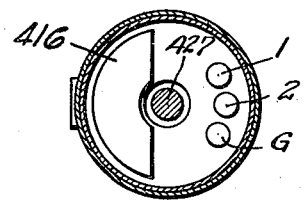
FIG.42
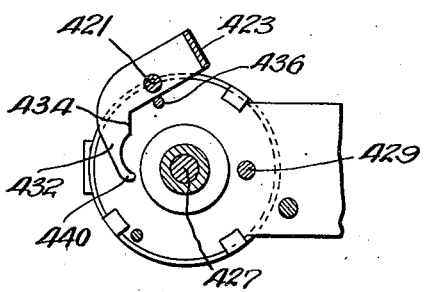
FIG.43
INVENTOR
HAROLD W. PRICE
BY H.O.Clayton
ATTORNEY Patented Oct. 15, 1940

2,218,136

UNITED STATES PATENT OFFICE 2,218,136

MONITOR CONTROL GEAR SHIFT

Harold W. Price, South Bend, Ind., assignor to Bendix Products Corporation, South Bend, Ind., a corporation of Indiana Application December 21, 1936, Serial No. 116,983

8 Claims. (Cl. 192—.01)

This invention relates to power transmission mechanism, and more particularly to control means therefor. The invention is especially useful as a means for operating the change-speed transmission of an automotive vehicle: however, other power transmission mechanisms may equally well be controlled by my invention.

It has heretofore been proposed to employ power means for effecting a change in the ratio of transmission gearing and with such an arrangement control mechanisms for said power means have been utilized, which have been conveniently located remotely from the transmission and readily accessible to the operator. The latter, when operating a motor vehicle equipped with such a structure, had merely to operate the conveniently located control mechanism by a simple manual movement, which thereby controlled the flow of fluid to said power device to effect a change in the speed ratio of the transmission gearing. In the constructions heretofore utilized, however, the control devices operable by the operator have taken the form of rotatable valve mechanisms, push buttons and other devices, the operation or movement of which was totally dissimilar from the operation of the conventional gear shift lever, which the power mechanism had replaced. Accordingly, an operator, accustomed to operating a vehicle provided with the conventional manually operated gear shift lever, was compelled to completely change his accustomed methods of gear changing when it became necessary for him to operate a vehicle equipped with the above-referred-to remotely controlled power gear shifting device. This has been found to be a rather serious disadvantage, resulting in confusion and improper operation of the power operated change-speed transmissions.

It is therefore one of the objects of the present invention to provide a transmission gearing control mechanism so constructed as to avoid the above-referred-to difficulties, and to this end the invention contemplates a power operated selective gear shifting mechanism so constructed and arranged that the movements of the same in effecting a control of the changing of the transmission gearing simulate in every respect the corresponding movements of a conventional manually operable gear shift lever to the end that an operator may readily operate a vehicle equipped with such mechanism in the same manner as if the vehicle were provided with a manually operable gear shift.

Another object is to provide, in a transmission gearing, controlling mechanism having gears shiftable by power, control valve mechanism for the power means, said valve mechanism being operated electrically, thereby providing a power means readily adaptable for remote control by the operator. Such a mechanism is particularly adapted for the control of selective gear transmissions, or other power transmission mechanisms, incorporated at either end of an automotive vehicle. Thus, for example, the invention will have utility with the advent of rear engine mountings.

Another object of the invention is to provide, in a device of the above character, a remotely positioned dummy gear shift lever operable in a gear shifting simulating manner to effect the control of power to the power operated gear shifting mechanism, whereby an operator may readily and efficiently control the necessary changes in the gearing ratios of the transmission by manually moving a control member in the same manner as that to which he has been accustomed when manually shifting the transmission gearing.

A further object of the invention is to provide, in electrical valve operating means, a manually operable selector switch operable to select any one of a plurality of circuits, said switch cooperating with a power operated switch automatically operable, with the gear shifting operation of the power means, to control said circuits. A follow-up type of valve control is thus provided.

Yet another object of the invention is to provide a manually operable preselector switch operable, in conjunction with a plurality of automatically operable power operated switches, to control a transmission operating power mechanism.

The invention further contemplates the provision of a manually operated switch mechanism selectively operable to insure, in part, any one of the five conventional operations of a three-speeds forward and reverse transmission.

The invention also contemplates pressure differential operated power means operable to select and actuate the conventional shifter rods of a standard three-speeds forward and reverse transmission in the same manner as now effected by the manually operable gear shift lever.

Yet another object of the invention is to provide a transmission gearing control mechanism so constituted as to enable an operator to preselect a desired gear relation of the transmission while another gear relation is established, the construction being such that the establishment of a preselected gear relation is effected in a novel and efficient manner.

Another object of the invention is to provide a novel power operated selective gear-changing transmission wherein novel control means are employed permitting a preselection of the desired gear relation and establishment thereof upon a subsequent disengaging operation of the clutch, thus enabling a desired gear relation to be preselected while the change-speed transmission is in another gear relation.

A further object of the invention is to provide, in an electrically operated valve operating mechanism, a manually operated switch selectively operable to effect, in part, the energization of any one of a plurality of solenoids, together with a plurality of power operated switches automatically operable to make, in part, a new circuit preliminary to energizing a second solenoid.

Yet another important object of the invention is to provide in an automotive vehicle provided with a standard three-speeds forward and reverse transmission, including shifter rails and means for selecting and operating said rails, power means of the preselective type for operating said transmission either to neutralize the same or to establish any one of its gear relations, said power means including a manually operable control member fully simulating, in its control movements, the movements of a manually operable shift lever of a standard transmission, and further including means operable, subsequent to a selecting operation of said control member, to insure a neutralization of said transmission and a selecting operation of said first-mentioned means prior to a gear establishing operation of said power means.

One of the principal objects of the invention is to provide power mechanism for operating a conventional change-speed transmission of an automotive vehicle, said mechanism to include motor means operable to effect any one of the settings of the transmission, speed responsive means for automatically controlling the motor means, and means, operable independently of the speed responsive means, for manually selecting the transmission setting operation of the motor means independently of the speed responsive means.

Another object of the invention is to provide novel and improved controlling means for gear shifting mechanism of this class whereby such mechanism may be automatically set progressively or retrogressively for certain of the gear changes in accordance with the increasing or decreasing speed of the automobile, or may be set manually by the driver to select any desired speed change, before the gear changes are actually made, the transmission thus being operated automatically according to the speed of the automobile or manually by the driver, being actually made when desired by a controlling device operative by the automobile driver.

Even more generally stated, the invention contemplates the provision of manually controlled power means for operating the transmission in substantially a conventional manner, and in addition to such a control to provide means for automatically controlling the operation of the transmission in accordance with the speed of the vehicle.

Yet another object of the invention is to provide a manually operable preselector switch operable in conjunction with a plurality of manually operated and power operated switches to control a transmission operating mechanism, either in accordance with the speed of the vehicle or as willed by the operator.

Yet another object is to provide in a mechanism of the type just described means normally biasing the power means to facilitate either a high or second gear operation of the transmission.

A further object of the invention is to provide a power gear shift mechanism including a so-called dummy gear shift lever selectively movable to any one of its control positions at any time during the operation of the vehicle and under any condition of operation, the mechanism being such as to insure the desired operation of the transmission.

Yet another object of the invention is to provide power means for operating a conventional three-speeds forward and reverse transmission, said means including a compact power unit of relatively few working parts which may be bracketed to the transmission housing.

Yet another object of the invention is to provide electrical means for operating the valvular unit of a transmission operating power unit, said electrical means including solenoids controlled by a clutch operated circuit breaker, a manually operated two-part selector switch, a power operated selector switch, and a power operated selector interlock switch, said switches being so constructed and arranged and so cooperating as to effect the previously described control of the power means.

Yet another object of the invention is to provide separate pressure differential operated units for operating the clutch and the transmission, said units being controlled, in part, by an accelerator operated pilot valve.

A further object of the inveniton is to provide pressure differential operated means for insuring a variable movement of the gears of the transmission as the transmission is being operated to establish the desired setting.

The invention further contemplates an electrical interlock whereby the transmission operating means may be rendered operative to shift gears only when and if the clutch is disengaged by an accelerator controlled power means: accordingly, with such a mechanism, the transmission may be power operated only when the accelerator is released to disengage the clutch.

A further object is to provide an interlock between a power operated clutch mechanism and power operated transmission mechanism wherein, with the power clutch mechanism cut into operation by a dash controlled switch, the accelerator serves to control the operation of a switch, permitting an operation of the transmission operating power means only when and if the accelerator is released.

Other objects and desirable features of the invention, including a clutch pedal operated ratchet type of progressive switch, the incorporation of a free-wheeling unit cooperating with the clutch to isolate the transmission and facilitate the operation of the transmission operating power means, a compact two-part manually operable selector switch, and a compact governor and switch unit, will become apparent from a reading of the following specification, taken in conjunction with the accompanying drawings. It is to be expressly understood, however, that the drawings are employed for purposes of illustration only and are not designed as a definition of the limits of the invention, reference being had for said purpose to the appended claims.

Figure 1:
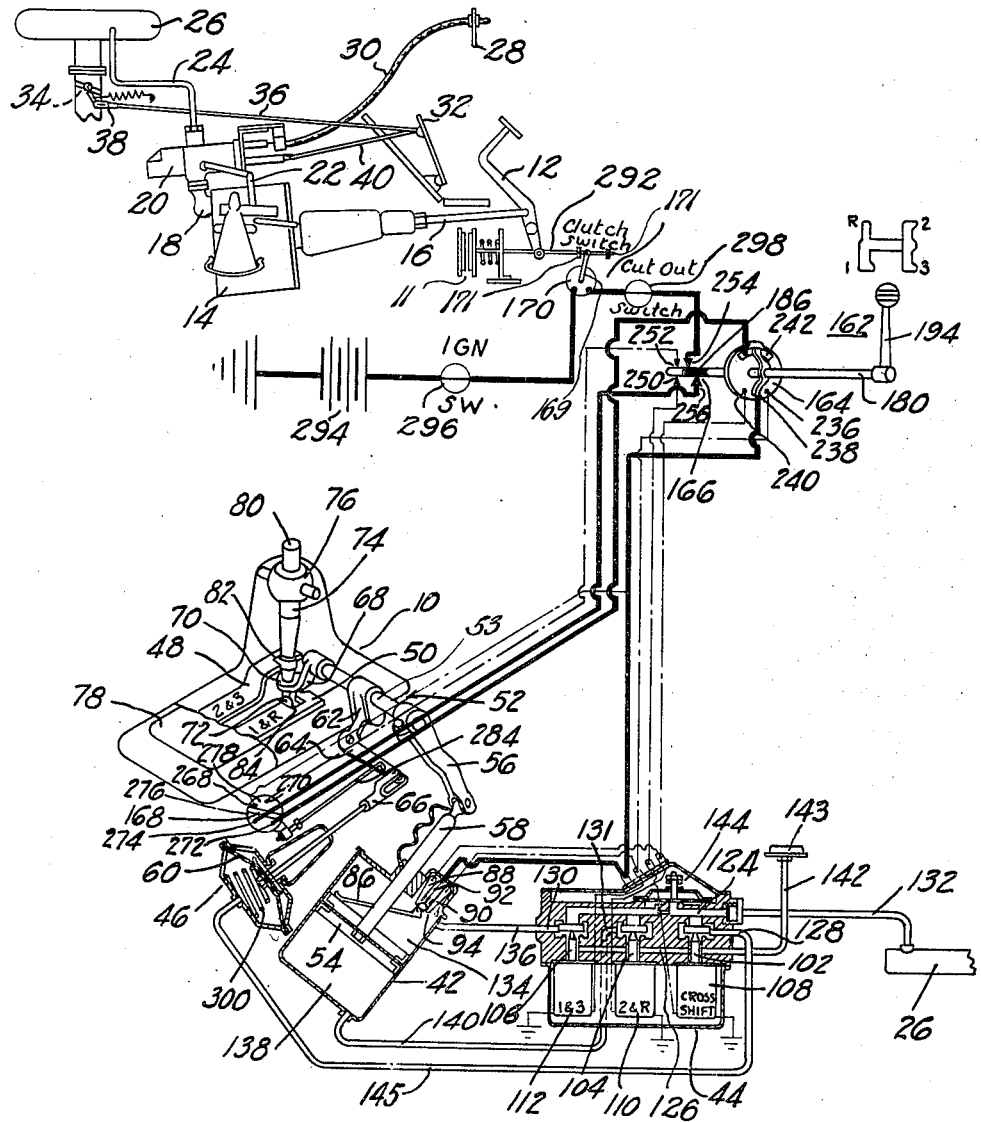
Figure 1 is a diagrammatic view disclosing, in part, certain essential features of the mechanism constituting the present invention.
Figure 2:
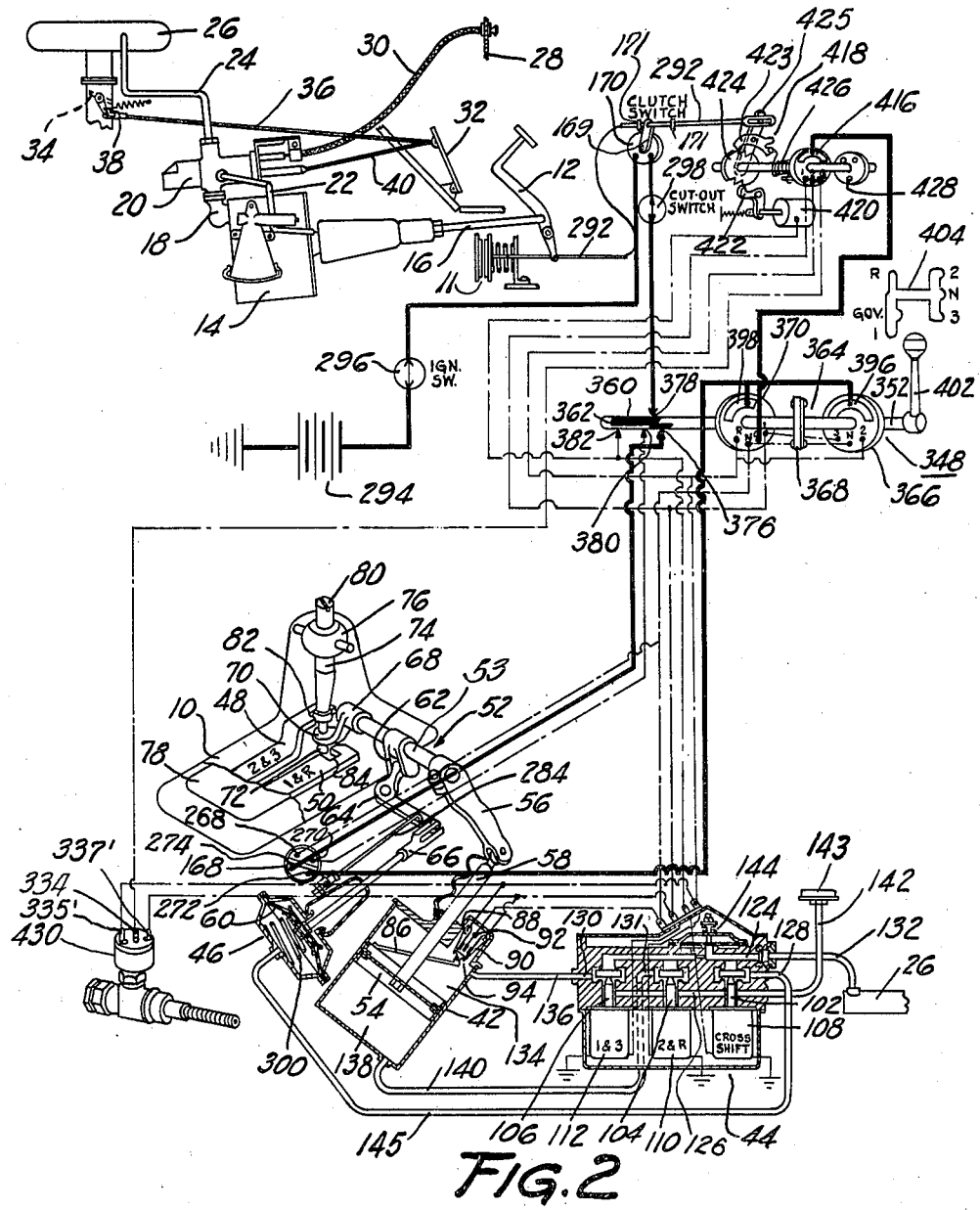
Figure 2 is a diagrammatic view disclosing all of the essential features of the mechanism constituting the present invention.
Figure 3:
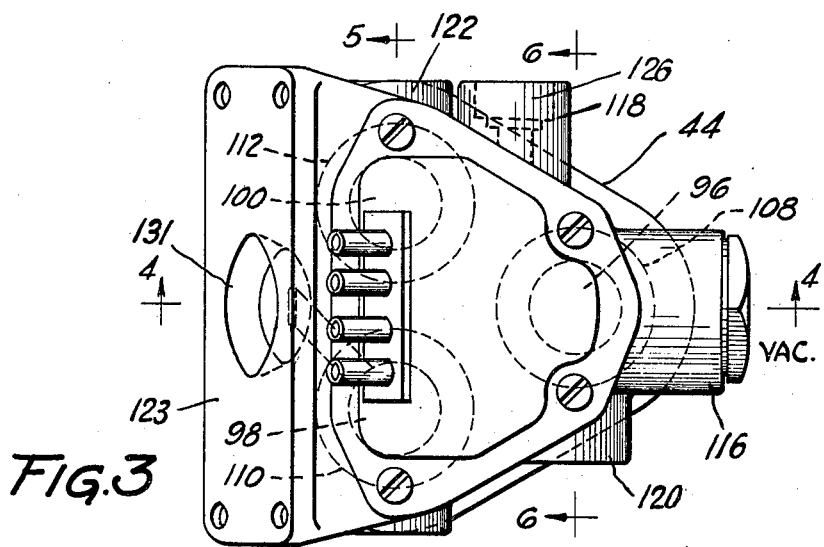
Figure 3 is a top plan view of the solenoid operated valve unit of the detachable power unit.
Figure 4:
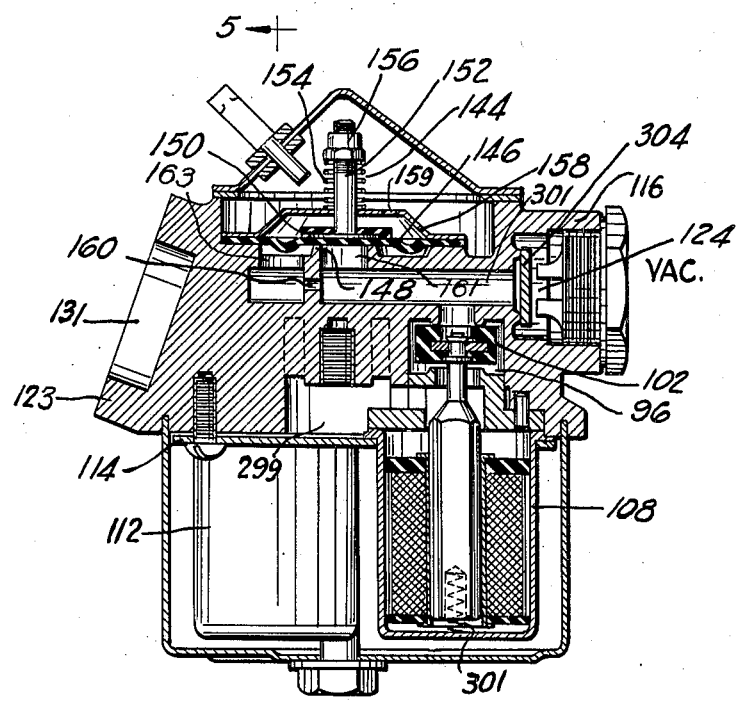
Figure 5:
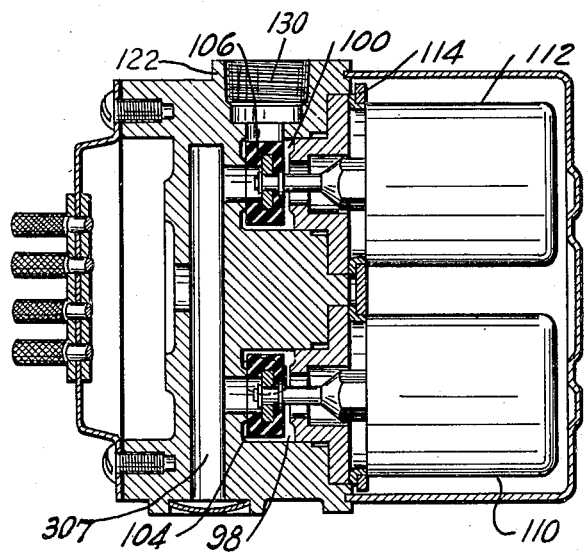
Figure 6:
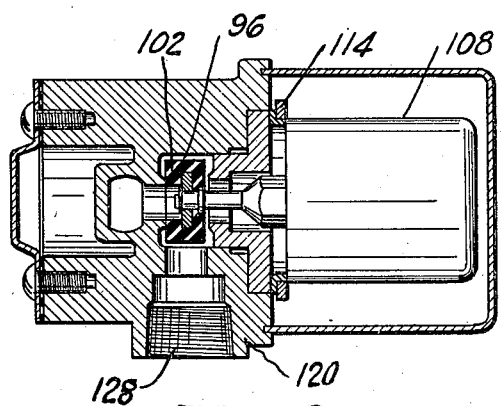
Figures 13, 14:
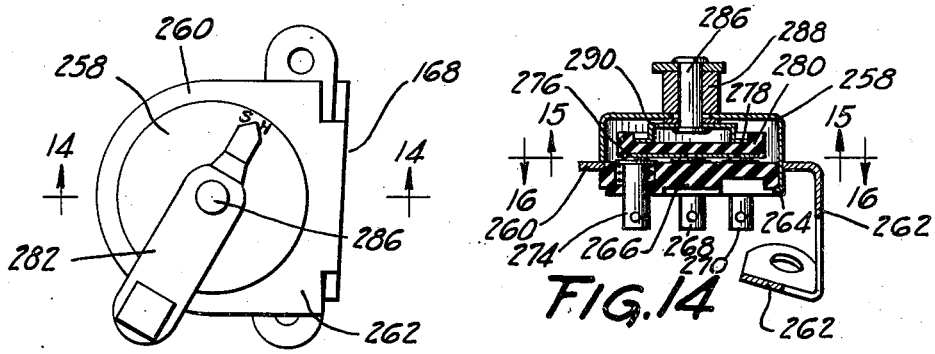
Figures 15, 16:
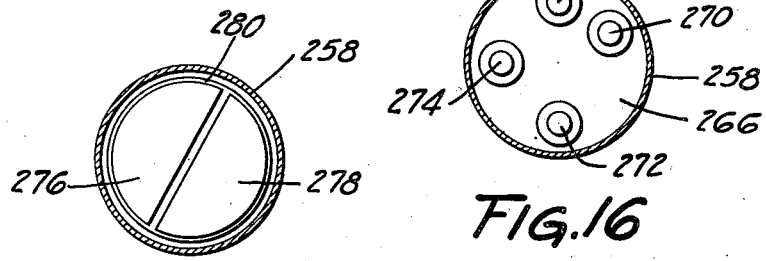
Figure 17:
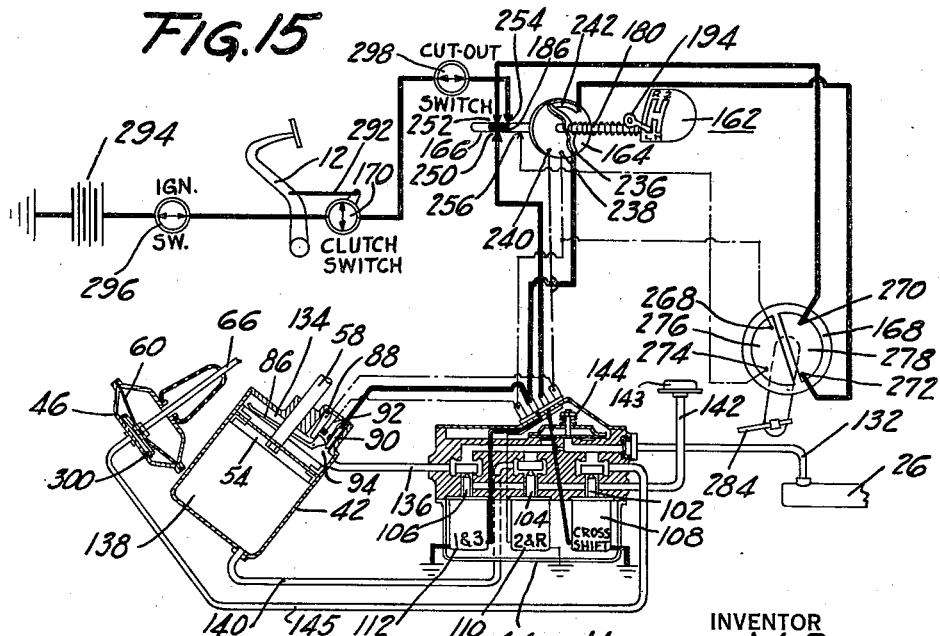
Figure 37:
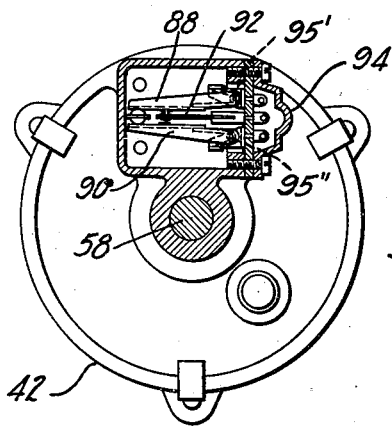
Figure 38:
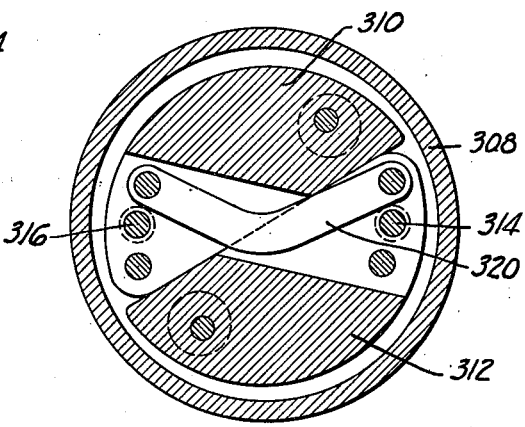
Figure 39:
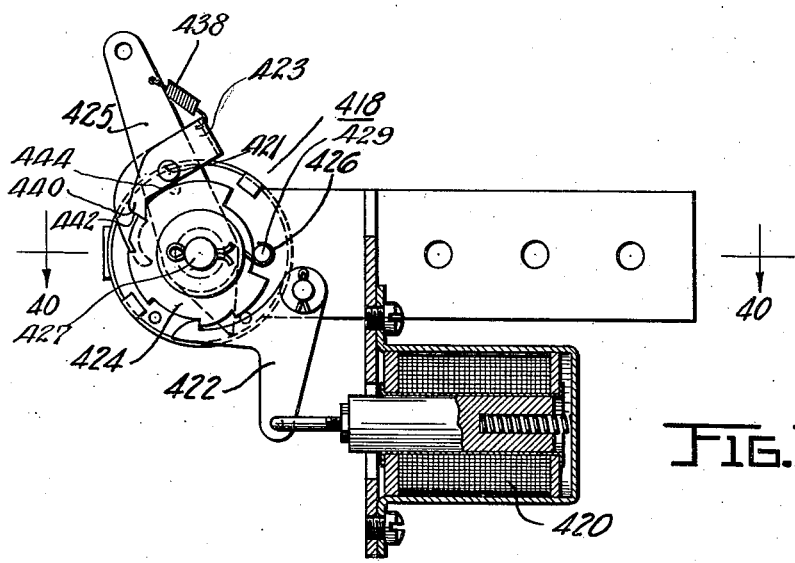

Figures 4, 5 and 6 are sectional views of the valvular unit, taken respectively on the lines 4—4, 5—5 and 6—6 of Figure 3;

Figure 7 is a top plan view of the manually operated two-part selector switch unit;

Figure 8 is a longitudinal sectional view of the selector switch of Figure 7, taken on line 8—8 thereof;

Figures 9, 10, 11 and 12 are transverse sectional views of the selector switch of Figure 7, taken respectively on the lines 9—9, 10—10, 11—11 and 12—12 of Figure 8; these views, together with Figure 8, disclosing the details of the switch mechanism;

Figure 13 is a top plan view of the power operated interlock switch cooperating with the manually operated selector switches and the power operated wiper switch to control the valve operating solenoids;

Figure 14 is a sectional view of the interlock switch of Figure 13, taken on the line 14—14 thereof;

Figures 15 and 16 are sectional views, taken respectively on the lines 15—15 and 16—16 of Figure 14, disclosing the details of the interlock switch;

Figure 17 is a diagrammatic view, similar in general to Figure 1, disclosing the positions of the parts of the mechanism to place the transmission in low gear;

Figure 18 is a view, also similar to Figure 1, disclosing the positions of the parts of the mechanism to place the transmission in second gear;

Figure 19 is a view of the mechanism with the transmission in low gear and the manually operated selector switch preselected to subsequently effect a shift into high gear upon release of the clutch;

Figure 20 is a diagrammatic view of the position of the power operated interlock switch with the shift rail operating lever in position to complete the shift into either high or second gear;

Figure 21 is a longitudinal sectional view of the hand operated selector switch mechanism disclosed in Figure 2;

Figures 22, 23, 24 and 25 are transverse sectional views of the parts of the switch mechanism disclosed in Figure 21, taken respectively on the lines 22—22, 23—23, 24—24 and 25—25 of Figure 21;

Figure 6 is a detailed view, in perspective, of part of the switch mechanism of Figure 21;

Figure 27 is a fragmentary sectional view of the switch mechanism of Figure 21;

Figures 28 and 29 are fragmentary sectional views of part of the switch mechanism of Figure 21; Figure 28 disclosing the switch in its cross shift position and not in its G or governor position, and Figure 29 disclosing the switch in its cross shift position and in its G or governor position;

Figure 30 is a longitudinal view, taken on the line 30—30 of Figure 31, through the governor and its cooperating selector switch;

Figure 31 is a top plan view of the governor and switch unit disclosed in Figure 30;

Figures 32 and 33 are sectional views of the governor and switch unit of Figure 30, taken respectively on the lines 32—32 and 33—33 thereof;

Figure 34 is a sectional view of the clutch operating power unit disclosed in Figure 2;

Figure 35 is a sectional view of the inertia operated portion of the clutch control bleed valve mechanism disclosed in side elevation in Figure 2;

Figure 36 is a sectional view disclosing details of the transmission operating motor and control switch disclosed diagrammatically in Figures 1 and 2;

Figure 37 is a view disclosing, in detail, the control switch mechanism mounted on the transmission operating motor;

Figure 38 is a sectional view of the governor operated switch mechanism of Figure 30, taken on the line 38—38 thereof;

Figure 39 is a view disclosing, in detail, the clutch pedal operated so-called progressive or ratchet switch disclosed diagrammatically in Figure 2;

Figure 40 is a sectional view of the progressive or ratchet switch, taken on the line 40—40 of Figure 39;

Figures 41 and 42 are sectional views of the ratchet switch, taken respectively on the lines 41—41 and 42—42 of Figure 40;

Figure 43 is another sectional view of the ratchet switch, taken on the line 43—43 of Figure 40, disclosing the details of the mechanism for permitting the pawl to move out of contact with the motor.

Referring to Figure 1, there is diagrammatically disclosed a conventional three-speeds forward and reverse transmission 10 interconnecting the internal-combustion engine and clutch with a drive shaft, not shown. If desired, a free-wheeling unit or overrunning clutch may be incorporated in the shaft to the rear of the transmission. The clutch 11 is adapted to be operated by a pedal 12 and also by a vacuum operated motor 14 the same being operably connected to the clutch pedal by a rod 16. A conduit 18 interconnects the motor with the three-way valve 19 of a combined three-way, bleed and cut-out control valve unit 20, no claim to which is made herein, inasmuch as the same constitutes the invention of Victor W. Kliesrath disclosed in his application No. 721,683, filed April 21, 1934, which has eventuated in Patent No. 2,173,116 dated Sept. 19, 1939. The bleed valve portion 21 of the valve unit constituting a tapered slot in the body of the aforementioned three-way valve member 19 is connected to the motor by a conduit 22, and a conduit 24 interconnects the unit with the intake manifold 26 of the engine. The cut-out valve 23 of the valve unit, operable to render the power means inoperative, is operated from the dash 28 by a Bowden control 30, and an inertia operated bleed valve 31 is incorporated in the conduit 22, said latter valve cooperating with the bleed valve 21 and a bleed valve 31' to control the clutch engaging operation of the motor 14. No claim is made to the aforementioned bleed valves, inasmuch as the same constitute respectively the inventions of applicant in his application No. 622,513, filed July 14, 1932, and of Roy S. Sanford in his application No. 645,298, filed December 1, 1932.

Briefly describing the operation of the power means for operating the clutch, upon release of an accelerator 32, connected to a throttle 34 by linkage 36 including a lost motion connection 38 and to the aforementioned three-way valve 19 by a link 40, the valve unit is operated to interconnect the manifold and motor, thus evacuating the left end compartment of the latter, causing movement of the piston of the motor 14 to the left to disengage the clutch. Upon depressing the accelerator the three-way valve of the valve unit is operated, prior to operation of the throttle, to vent the left compartment of the motor to atmosphere to thereby initiate the engagement of the clutch, the rate of such engagement being determined by the rate of egress of air from the right compartment of the motor via a slot in the rod 16 and the bleed valve element of the valve unit. This construction is such as to provide for a rapid clutch engagement until the clutch plates contact, then a slow cushioning engagement, depending upon the degree of depression of the accelerator. This construction is described in greater detail in the aforementioned application.

The invention is particularly directed, however, to remotely controlled power means for operating the changeable-speed transmission, the control being in such fashion as to accurately simulate a conventional manual operation of the transmission. As diagrammatically disclosed in Figure 1, the power means includes a power unit, comprising a double-ended shift motor 42, a solenoid operated control valve unit 44 and a cross-shift motor 46, preferably secured together as one unit. The solenoid operated control valve 44 constitutes an electro-magnetically controlled means for controlling the operation of the motors 42 and 46. The power unit, which may be termed an accessory, may be detachably secured either to the transmission housing or to an adjacent portion of the chassis. The motors of the power unit are preferably operably connected to the two conventional gear-changing element or so-called shift rails 48 and 50 of the transmission by a lever 52 fulcrumed within a bearing, not shown, a piston 54 or power element of the motor 42 being connected to the lower end of an arm 56 of the lever by a connecting rod 58, and a diaphragm or power element 60 of the motor 46 being connected to a projecting ear 62 on the lever by linkage including a bell crank 64 and rod 66. The lever 52 further comprises a projection or arm 68, at the end of which is secured a crank arm 70 swivelly connected to a rounded end portion 72 of a shift rail operating lever 74, the central portion of which constitutes a rotatable shaft 53. The arms 68 and 70 together constitute a rotatable shift rail actuating member connected to one or the other of the shift rails through the intermediary of the end portion 72. The lever 74 is universally mounted at its upper end within in a projection 76 of a slightly modified form of transmission cover plate 78, the latter being the only part of the transmission varying from standard construction. Should the transmission operating power means be rendered inoperative, a lever member, not shown, may be detachably secured to a projection 80, thus providing means for manually operating the transmission in the conventional fashion.

As particularly disclosed in Figures 1 and 2, end portion 72 of the lever 74 is adapted to selectively fit within one or the other of slots 82 and 84 in the shift rails 48 and 50 respectively. As disclosed in Figures 1, 2 and 36, the piston 56 is adapted to contact a lever 86, serving to actuate switch contact members 88 and 90 contactible with a contact 92, said switch members and contact being housed within one end of the motor 42. This selector switch mechanism is indicated as a whole by the reference numeral 94 and may be defined as a neutralizing switch. The lever 86 is held in contact with the piston 54 by a coil spring 95. The members 88 and 90 are urged into contact with the end of the lever 86 by springs 95' and 95''.

The aforementioned valve unit 44 preferably comprises a substantially triangular-shaped casting provided with three vertically extending bores 96, 98 and 100 adapted to receive reciprocable spool-shaped valve plungers 102, 104 and 106. The shank portions of the plungers serve as armatures, having a sliding fit within windings of solenoids 108, 110 and 112 secured to the casting by a plate 114 and operable, when energized, to actuate the valve plungers. The casting is provided with five bosses 116, 118, 120, 122 and 123 bored to provide respectively ports 124, 126, 128, 130 and 131 connected respectively to the intake manifold by a conduit 132, to the atmosphere by a conduit 142 connected to an air cleaner 143, to the cross-shift motor 46 by a conduit 145, to a front end compartment 134 of the motor 42 by a conduit 136, and to a rear end compartment 138 of motor 42 by a conduit 140.

As a further feature of my invention, there is disclosed in Figures 1, 2 and 4 means for insuring a variably engaging movement of the transmission, assuming that the same is of the so-called synchronizing type. When the air or equivalent power fluid is being drawn out of either of the compartments 134 or 138 of the motor 42, the gaseous pressure within the compartments will be relatively high, until the brake of the synchronizer unit of the transmission offers resistance to further engaging movement. Such gaseous pressure is, in part, controlled by valve mechanism 144 comprising a diaphragm 146 and a valve seat 148. The diaphragm is urged upwardly by a spring 154, interposed between a nut 156 threaded on the end of a shank 152 secured to the diaphragm, and a cover plate 158. When the aforementioned resistance is encountered, the gaseous pressure of the evacuated motor compartment automatically decreases by virtue of the retardation of the piston 54. The diaphragm 146 then automatically seats, against the resistance of the spring 154, and by virtue of the degree of pressure differential to which the diaphragm is subjected. The upper surface of the diaphragm is at all times subjected to atmospheric pressure via a port 159 in the cover plate 158. The subsequent rate of movement of the gears to be meshed is then relatively low by virtue of a bleed port 160, said port effecting a slower rate of egress of air from the motor compartment. After the friction clutch of the synchronizer mechanism functions to bring the gears to be meshed to the same speed of rotation, then the resistance to movement of the piston 54 is substantially lower, whereupon the piston immediately continues its movement to complete the meshing of the gears. This movement, however, reduces the size of the compartment of the motor being evacuated, immediately resulting in an increase in the gaseous pressure within the compartment. This increase in pressure results in the spring 154 expanding to unseat the diaphragm 146 to again permit a more rapid efflux of air from the compartment being evacuated. This air passes through ports 161 and 163, disclosed in Figure 4. There is thus provided automatically operable pressure differential operated means for insuring a variable rate of movement of the gears during the gear setting operation of the transmission. The piston 54 successively moves fast, then slow, then again fast to complete the meshing of the gears.

In addition to the automatically operated valve mechanism 144, the control means for the transmission operating power means includes a two-part manually operable selector switch, referred to as a whole by the numeral 162 and constituting separate selector switches 164 and 166. The control means further includes an automatically operated selector type of interlock switch 168 and a circuit breaker 170, operated by the clutch operating mechanism: these switches will now be described in detail.

The selector switch 162, detailed in Figures 7 to 12 inclusive, preferably comprises an angular-shaped three-part casing adapted to be detachably mounted by fastenings 172 upon the steering column, not shown, immediately beneath the steering wheel, not shown, so as to be operable by the fingers of the driver as he steers the vehicle. Flanges 174 and a pin 176 provide a bearing support for the casing in its attachment to the steering post. The casing is preferably so cast as to provide spider-lie interior supports 178 for the switch mechanism. The latter preferably comprises a bodily and angularly movable rod 180 provided with a socket 182 at one of its ends to tightly receive a pin 184, the latter having sleeved thereover a tubular-shaped contact sleeve 186. Tubular insulator members 188 and 190 are also mounted on the pin at each end of the sleeve member 186, the latter together with the insulators being firmly held as a unit by an enlarged portion 192 at the end of the pin.

The rod 180 and pin 184 are manually actuated as a unit by means comprising a lever member 194 tightly sleeved over a two-diametered rod 196, the latter being slidably mounted in an angular-shaped fitting 198 fixedly secured to the rod by a pin 200. Oppositely disposed guide pins 202 extending from the rod fit within guide slots 204 in the fitting. A spring 206, interposed between the upper end of a tubular recess 208 in the fitting and a stop 210, serves to normally bias the rod 196 downwardly so that a larger diametered portion 212 thereof abuts the top of the fitting. The rod 196 is adapted to slide within the various channels of an H-shaped slot, Figures 1 and 2, formed in the cap portion 214 of the switch housing, said cap being detachably secured to the body portion of the switch by dowel pins 216 and stay bolts 218. As will be apparent, the aforementioned construction is such as to enable the control lever 194 to be actuated in a manner accurately simulating the operation of a conventional shift lever. There is this difference, however, in that to shift into reverse it is necessary to first lift up the lever 194 against the action of spring 206, thus making it possible for the smaller diametered portion of the rod 196 to fit within a relatively narrow "reverse" channel 219 of the H slot. Such a structure thus prevents an inadvertent selection of reverse gear. The switch mechanism just described is not claimed herein, inasmuch as the same is described and claimed in my application No. 11,945, filed March 20, 1935.

Continuing the description of the selector switch mechanism 162, a disk-shaped insulator member 220 is keyed to the rod 180, said member having secured thereto, by contact pins 222, 224 and 226, a conductor ring 228. The disk member 220 is preferably biased, by a spring 230, into engagement with a stationary disk-like switch member 232 of insulating material, the latter being mounted within the spider by a locking ring 234. Contact pins 236, 238 and 240 extend through the upper portion of the member 232, and in the lower portion thereof there is embedded a contact sector 242, the latter having two contact posts 244 and 246 projecting through the member. The pins 222 and 224 of the member 220 are adapted to at all times contact the sector 242, and the pin 226 of said member selectively contacts one or the other of pins 236, 238 and 240 depending upon the angular position of the rod 180 and its connected member 220. The switch member 232 is preferably extended to provide a tubular shank portion 248, also of insulating material. Clip-like contact members 250, 252, 254 and 256 secured to recessed portions within the shank 248 are adapted to be contacted by the sleeve 186 to select the circuits to the solenoids and the interlock switch 168 described hereinafter.

The interlock switch 168, disclosed in detail in Figures 13 to 16 inclusive, preferably comprises a cup-shaped casing 258 positioned over a circular opening in a support member 260, the latter provided with an angular-shaped bracket extension 262 adapted to be secured to a convenient portion of the chassis, as disclosed in Figure 2. Fastening tabs 264 extend through the opening in the support member and, together with the latter, secure in position a disk-like mounting 266 of insulating material. Four contact pins 268, 270, 272 and 274 secured within the mounting 266 are adapted to be contacted by spaced contact sectors 276 and 278 fixedly secured upon the lower face of a disk 280, also of insulating material. A crank 282 is operably connected, by a link 284, to one end of the bell crank 64, Figures 1 and 2. To the crank is secured a pin 286 swivelled within a tubular bearing member 288, the latter rigidly secured to the casing 258. A cup-shaped stamping 290, fitting within a recess in the member 280, is rigidly secured to the pin 286 and is rotated by the member 282 with actuation of the bell crank 64.

As to the remaining elements of the electrical hookup, the aforementioned circuit breaker 170 is of conventional design and is arranged to be operated by a rod 292 connected to the clutch pedal 12, Figure 1. An arm 169 for actuating the breaker 170 is connected to the rod 292 by a lost motion connection including blocks 171, the rod being slidable through an opening in the end of the arm. The blocks are preferably adjustably mounted on the rod 292. The breaker 170 functions as a master or pilot switch, completing a circuit to a battery 294 and thus permitting a power operation of the transmission only when the clutch is disengaged.

Briefly describing the wiring hookup, solenoid 108 is wired to contact 250 of the selector switch 162, which has heretofore been described as a two-part switch, including switches 164 and 166. Solenoid 110 is wired to contact 88 and solenoid 112 to contact 90 of the switch 94. Neutral bar 92 of the neutralizing switch 94 is wired both to contact 238 of selector switch 164 and to contact 268 of interlock switch 168; contacts 88 and 90 of the switch 94 are wired respectively to contacts 240 and 236 of selector switch 164; contacts 252 and 256 of selector switch 166 are wired respectively with contacts 270 and 272 of the interlock switch 168; and contact sector 242 of selector switch 164 is wired to contact 272 of the interlock switch 168; and lastly, the hot wire connection from the battery 294 to contact 254 of the selector switch 166 includes a conventional ignition switch 296; the circuit breaker 170 and a cut-out switch 298 in series.

Describing now the operation of the invention, and referring particularly to Figures 1 and 17 to 20 inclusive, with the car parked and the engine dead the ignition switch 296 is turned on and the clutch pedal depressed manually, thus establishing a circuit from the battery 294 to the selector switch 162 via the ignition switch 296 and circuit breaker 170. The starter switch is then operated to crank the engine, the latter, when idling, creating a vacuum in the manifold. The manifold thus becomes a source of power to operate the clutch and transmission operating motor units.

The accelerator being released, the valve 20 is rendered operative to connect the manifold with the clutch motor, energizing the latter to maintain the clutch disengaged. The operator may now remove his foot from the clutch pedal. At this time the elements of the transmission operating power mechanism are in the "neutral" position disclosed in Figure 1, a spring 300 within the cross-shift motor 46 biasing the lever 74, through the intermediary of the levers 64 and 52, into engagement with the high and second gear-changing element or shift rail 48 and a spring 302, within the switch 162, biasing the control lever 194 to its neutral position in the high and second channel of the H slot. The spring 300 also serves to position the interlock switch 168 as disclosed in Figure 1, the contact sector 242 of selector switch 164 being connected with the battery via the interlock switch 168, contact sleeve 186 and contacts 254 and 256 of selector switch 166, the latter switch being so established by the spring 302 in biasing the control lever to the right. The elements are thus positioned to subsequently selectively establish circuits, via the selector, to energize either of solenoids 110 or 112 to effect a shift into either high or second gear.

It is the usual practice in starting the car to place the transmission either in low or second gear; therefore, there is disclosed in Figures 17 and 18 respectively the positions of the parts with the transmission so established. The present practice of a large number of drivers is to start in second gear, assuming of course that the power plant will not be unduly strained. Referring therefore to Figure 18, the control lever 194 is shown in its second gear position, thus establishing a circuit from the battery to solenoid 110 via contacts 254 and 256 and contact sleeve 186 of selector switch 166, contacts 272 and 274 and contact sector 276 of interlock switch 168, contact sector 242 and contact 240 of selector switch 164. Solenoid 110 is thus energized, drawing the valve plunger 104 downwardly against the action of a return spring 301 to cut off the vent connection between the compartment 138 of the shift motor 42 and the atmosphere via conduit 142, a chamber 299 within the casting of the valve 44, port 131 and conduit 140, and establishing a connection between said compartment 138 and the manifold via conduit 132, valve port 124, valve duct 301, valve ports 161 and 163, bleed port 160, a duct 307, bore 98, port 131 and conduit 140. The connection with the manifold having been established, the compartment 138 is evacuated to draw the piston 54 downwardly, thus rotating the levers 52 and 74 clockwise to move the shift rail 48 and effect the shift into second gear. This movement of the piston is permitted by virtue of the fact that the compartment 134 of the motor 42 is at that time vented to atmosphere via the valve 44.

The neutral and second gear positions of the parts having been described, there remains to be described one of the important features of the invention; namely, the particular construction, arrangement and operation of the mechanism insuring the desired operation of the transmission under all conditions of preselection of the control lever, for it will be apparent that with the clutch engaged, thus breaking the circuit to the battery, the driver may at any time during the operation of the vehicle, whether parked or in motion, preselect a desired subsequent operation of the transmission. Figure 19 will now be referred to to describe the aforementioned functions of the mechanism. In this figure the transmission is disclosed as established in low gear and the control lever 194 preselected to effect high gear.

Referring first, however, to the operation of effecting low gear from the neutral position of Figure 1, the control lever is moved bodily to the left through the channel, or so-called gate, of the aforementioned H-shaped slot and then rotated to the low gear position within the slot. This low gear position of the parts is disclosed in Figure 17. The contact sleeve 186 is thus moved to the left to interconnect contacts 250 and 254 and, with the clutch disengaged, energize solenoid 108. The valve unit 44 is thus operated to cut off the atmospheric vent to the cross-shift motor 46 and interconnect the manifold with said motor. The motor 46 is thus evacuated, moving the contact sector 278 of the interlock switch 168 to the position disclosed in Figure 17, and furthermore moving the diaphragm 60 to the left, to rotate the bell crank 64 clockwise, pulling the lever 52 bodily outwardly, and to move the lever 74 into mesh with the low and reverse shift rail 50. The lever 194 having been actuated as aforementioned, to select low gear, a circuit is made from the hot wire leading from the battery 294 to the solenoid 112 via contact 254, contact sleeve 186 and contact 252 of selector switch 166, contact 270, contact sector 278 and contact 272 of interlock switch 168, contact sector 242, conductor ring 228 and contacts 226 and 236 of selector switch 164. The solenoid 112 is thus energized and the compartment 134 connected, via the valve unit 44, with the intake manifold. The compartment 134 is thus evacuated, drawing the piston 54 upwardly, rotating the lever 52 counterclockwise to move the lever 74 and its connected rail 50 to effect the shift into low gear. The compartment 138 of the motor 42 is at the time vented to the atmosphere to permit this movement of the piston.

One feature of the invention disclosed in both Figures 1 and 2 should be particularly noted, this being that with movement of either shift rail to mesh the gears the lever 86 is moved to actuate neutralizing switch 94. Referring to Figure 1 for example, the lever 86 is moved, when either first or high gear is established, to make the circuit to solenoid 110 by virtue of the engagement of the contacts 88 and 92. There is thus insured a neutral position of the transmission prior to a subsequent operation thereof. The aforementioned return springs within the valve 44 serve to return the valves to their positions to vent the motors 42 and 46 upon deenergization of the solenoids. Furthermore, the above described making of a circuit via the contacts 88 and 92 makes possible a neutralization of the rail 50 with a neutral "selection" of the selector 162. It will also be noted that should the transmission gears abut without meshing, one or the other of solenoids 110 and 112 remains energized to thus maintain the energization of the motor 42, until the breaker 170 is operated. The latter function is insured not only by the operation of the breaker 170, as described below, but also by virtue of a check valve 304 incorporated in the valve unit 44. The check valve serves to maintain the motor evacuated despite an opening of the throttle, which destroys the vacuum within the manifold. The circuit breaker 170 is designed and adjusted to maintain the circuit until the clutch plates have contacted sufficiently to effect the meshing of the gears, the latter remaining power loaded until completely in mesh.

Continuing now the discussion of the disclosure of Figure 19, the transmission having been established in low gear and the selector 162 preselected to establish high gear, with disengagement of the clutch a circuit is established to solenoid 110 via selector switch 164, interlock switch 168 and the lever operated switch 94. The heavy lines in the figure indicate the established circuit referred to. The energized solenoid 110 thus operates valve 104 to energize the motor 42 and return the lever 74 and its connected low and reverse rail 50 to its neutral position. When the lever 74 reaches this position, it is immediately moved into mesh with the second and high rail 48 by virtue of the expanding action of the spring 300 of the deenergized motor 46. The latter action serves to rotate the interlock switch 168 counterclockwise to the position disclosed in Figure 20, thus automatically establishing a circuit from the hot wire, via selector 166 and the interlock switch 168, to the selector 164. It will be remembered, however, that the latter has been actuated to select high gear. Thus, a circuit is again established to energize solenoid 112, the circuit being completed through the interlock switch 168, the circuit through the switch 94 having been broken when the transmission was neutralized. The energized solenoid 112 actuates valve 106 to energize the motor 42, moving the piston 54 back to its position disclosed in Figure 19 and the rail 48 into position to establish high gear.

It is believed the aforementioned description will suffice to indicate the complete operation of the power mechanism, it being apparent that the dummy shift lever may be selectively moved to any of its control positions at any time during the operation of the vehicle and under any condition of operation, the mechanism, including the two manually operable selector switches, the power operated interlock switch, the lever operated switch, and the clutch operated circuit breaker, preventing an operation of the transmission when the clutch is completely engaged and insuring both a neutralization of the transmission and a selection of one or the other of the shifter rails prior to establishing the desired gear relation.

Describing now the interlocked clutch and transmission operating power mechanism disclosed in Figure 2 constituting the essence of my invention, there is provided, in addition to the mechanism disclosed in Figure 1, with means for automatically selecting the setting of the transmission with operation of the clutch pedal and in accordance with the speed of the vehicle.

To the circuits disclosed in Figure 1 there are added, in parallel relation thereto, governor and clutch pedal controlled circuits, together with their cooperating elements. The hookup of Figure 1 remains unchanged, the additional mechanism disclosed in Figure 2 being added to provide the control set forth above and in the objects of the invention. Interlock connections remain the same, the only major modifications of the mechanism of Figure 1 being the provision of a selector switch very similar to the switch 162 the same having a slotted contact sleeve, Figures 22, 23 and 24, and the inclusion in the switch of the extra control or so-called governor contact indicated by the letter G. Let it be stressed here that no claim is made to the mechanism disclosed in Figure 1, which is disclosed, described and claimed in my aforementioned application Serial No. 11,945, filed March 20, 1935. The mechanism of Figure 1 has been described in detail in this specification in order to make the operation of the mechanism of Figure 2 clear, to amplify the description of the mechanism of Figure 2 and to emphasize the importance of the mechanism of Figure 1, particularly the additions thereto necessary to provide, at the will of the driver, either an automatic or a selective operation of the transmission. The mechanism of Figure 2, with the exception of the selector switch 348, which incidentally retains all of the functions of the selector switch 162 of Figure 1, duplicates in every detail the mechanism of Figure 1 and adds thereto mechanism for effecting, at the will of the driver, an automatic operation of the transmission as the accelerator is depressed and released.

Describing in detail the selector switch of the mechanism of Figure 2, which is disclosed in Figures 21 to 29 inclusive, and indicated as a whole by the reference numeral 348, the same comprises a tubular-shaped three-part casing 350 adapted to be detachably mounted by fastenings upon the steering column of the car immediately beneath the steering wheel, not shown, so as to be operable by the fingers of the driver as he steers the vehicle.

Within the casing there is journaled a bodily and angularly movable rod 352 provided at one of its ends with a projection 354, the latter receiving a sleeve 356 of insulating material. The sleeve is recessed at 358 to receive a tubular contact member 360, provided with a slot 363 for a purpose to be described hereinafter. As with the switch 162 of Figure 1 the switch 348 comprises two separate selector switches 362 and 364. The switch 364 comprises three disk-like members 366, 368 and 370 of insulating material clamped together by a clip 372, the member 368 being keyed to the rod 352 and the member 370 being provided with a tubular shank portion 374 constituting a housing for contact members 376, 378, 380 and 382 of the selector switch 362, functioning in the same manner as contact members 256, 254, 252 and 250 respectively of selector switch 162 of the mechanism of Figure 1. The switch member 368 is spring loaded by springs 384 and 386 sleeved over the rod 352 and has secured thereto, by contact members 388, 390 and 392 a conductor ring 394. The members 388, 390 and 392 and the ring 394 may be defined as a controlling contact unit. The switch member 366 is provided with contacts 2, N, 3 and 396 and the member 370 with contacts 1, N, R, G and 398, said contacts being wired to the solenoids of the valve unit 44 and other parts of the mechanism, all as will be described in greater detail hereinafter. The contact G may be defined as a governor contact.

To the outer end of the rod 352 is secured a fitting 400 bored to slidably receive a miniature two-diametered shift lever or controlling member 402 adapted to be received in an H-shaped slot 404. The lever 402 is biased to the position disclosed in Figure 21 by a spring 406. A guide pin 408 is slidably received within a slot 410 in the fitting and, as also disclosed in Figure 1, a section 412 of the H-shaped slot is narrower than the remaining sections thereof, said narrower section being adapted to receive a smaller diametered portion 414 of the lever 402.

Describing the operation of the mechanism of Figure 2, and incidentally completing the description of said mechanism, the accelerator is released to idle the engine and disengage the clutch, whereupon the shift lever 402 is moved into its low gear position in the H slot 404. When the lever reaches its position in the first and reverse channel of the slot, the solenoid 108 is energized to operate the valve operating plunger 102 to thereby energize the motor 46 and place the end of the lever 74 in contact with the low and reverse shift rail 50. Tracing the circuit interconnecting the battery 294 and the solenoid 108, the same includes clutch operated switch 170, which is at the time closed, contact 378, contact member 360 and contact 382 of switch 362, and of course the interconnecting wiring. The aforementioned position of the shift lever 402 also results in completing a circuit from the contact 382 to a solenoid 420, the latter being then energized to actuate a holding pawl 422 constituting a part of a clutch pedal operated progressive selector switch 418, disclosed in Figures 2 and 39 to 41 inclusive. With the release movement of the pawl, a rotor 424 of the switch 418 is rotated clockwise by a spring 426 to its off position, whereby a contact 428 of the switch is moved to contact with the low speed contact indicated by the numeral 1 in Figure 2. As disclosed in Figures 39 and 40, the spring 426, which is coiled about a shaft 427, is secured at one of its ends to a pin 429 and is secured at its other end to the rotor 424. The contact 428 is secured to a disk 431 of insulating material keyed to the shaft 427, and with rotation of the shaft this contact successively moves into contact with the aforementioned low speed contact 1, a second speed contact 2 and a so-called governor contact indicated by the letter "G". Contacts 433 and 435, extending through the disk 431, are at all times in contact with a conductor plate or contact 416 wired to governor contact G of the selector switch 348.

The shift lever 402 is then rotated counterclockwise into its low gear position. In this position of the lever, the switches 362 and 364 are set to complete a circuit interconnecting the battery 294 and the solenoid 112. Tracing this circuit, the same includes, in addition to the closed clutch operated switch 170, contact 378, contact member 360 and contact 380 of switch 362, contacts 272 and 270 of interlock switch 168, contact bars 396 and 398, contact 1 of switch 364, contacts 416 and 1 of switch 418, and the interconnected wiring. The solenoid 112 being energized, the valve operating plunger 106 is operated to effect an energization of the motor 42 and place the transmission in low gear. Low gear having been established, the accelerator is then depressed to operate the clutch control mechanism to engage the clutch and accelerate the vehicle to the desired speed. When the clutch is being engaged, a pawl 423 secured to a crank 425 of the switch 418 by a pin 421, serves to rotate the rotor member 424 of the switch 418 counterclockwise against the tension of the spring 426. This rotation moves the contact 428 of the switch 418 into registry with the contact 2 thereof, thereby, in part, preparing for the establishment of a circuit to energize the solenoid 110 to place the transmission in second gear. The crank 425 is connected to the clutch pedal operated rod 292 by means of a lost motion connection 291 including a pin and slot as disclosed in Figure 1. Such a construction, together with the lost motion connection between the breaker operating arm 169 and rod 292, makes possible the desired relative timing of operation of the clutch and transmission heretofore described.

As disclosed in Figure 43, the pawl 423 is U-shaped, one side of the same being extended to provide what may be defined as a cam member 432. Now, when the clutch pedal 12 is moving to its disengaged position, the crank 425 and pawl 423, as will become evident from an inspection of Figure 2, are moved clockwise preparatory to again moving the rotor 424 counterclockwise. When the crank and the pawl mounted thereon reach their extreme positions to the right, a portion 434 of the cam member moves into contact with a pin 436, rotating the pawl 423 clockwise about its pivot 421 against the tension of a spring 438. This movement lifts the end 440 of the pawl out of the notch 442 and onto the outer edge of the rotor 424 at 444 and makes possible the above-described clockwise rotation of the rotor 424 by the spring 426.

After the car is under way in low gear and while the desired speed is being reached, the driver may then place the shift lever 402 in its G position to make possible all subsequent operations of the transmission automatically. In this G position of the switch 364, the shift rail 50 having been moved to its low gear position, there is established, when the clutch is disengaged, a hot wire connection from the battery 294 to the solenoid 110 via closed switch 170, contact 378, contact member 360 and contact 376 of selector switch 362, contacts 268 and 274 of interlock switch 168, contacts 92 and 88 of switch 94, and of course the interconnecting wiring. The wiring of a hot wire lead to the switch 418 is shown in heavy black lines in Figure 2, the position of the parts, selected merely for the purpose of illustration, being the G selection of the switch 364 made prior to starting the engine, or when the transmission is in neutral.

After the desired speed of the car is reached in low gear, the accelerator is released to disengage the clutch and complete the circuit just described, whereupon the motor 42 is energized to return the shift rail 50 to its neutral position. The spring 300 of the cross-shift motor 46 then functions to move the end 72 of the shift lever into engagement with the second and high gear shift rail 48 and actuate the interlock switch to the position disclosed in Figure 2. The motor 42 is then again energized to place the transmission in second gear. To effect this operation the solenoid 110 is, of course, again energized, the circuit thereto including closed switch 170, contacts 378 and 376 and contact member 360 of switch 362, contacts 272 and 274 of switch 168, contacts 396, 398 and G of switch 364, contacts 416 and 2 of switch 418, and the interconnecting wiring. The accelerator is then depressed to speed up the car in second gear, whereupon the clutch is engaged and the rotor 424 is again actuated to move the contact 428 into registry with the aforementioned G contact in the switch 418, the latter being wired to a governor controlled selector switch mechanism 430, which, as described hereinafter, is so wired to the valve mechanism 44 and the switch 94 within motor 42 as to make possible the establishment of the transmission in either second or high gear, depending upon the speed of the vehicle. The switch 430 is therefore a power operated switch, whereas the switches 348 and 418 are manually operated.

This governor controlled switch mechanism comprises a casing 308 adapted to be secured to the chassis of the vehicle. Centrifugally operated mechanism of the governor is rotatably mounted within the casing, the same comprising two pairs of sector-shaped plates 310 and 312, tied together by pins 314 and 316 and secured to the plate 318 by said pins. To insure a properly synchronized movement of the plates 310 and 312 one pair of the same is preferably secured to the remaining pair by an angularly-shaped link 320, Figure 38. To the plate 318 is secured a shank 322 journaled in a bearing 324, constituting a part of the casing 308. A pin 326 projecting from the end of the shank is secured by means such as a Bowden connection drivably secured to the propeller shaft of the vehicle, not shown.

A housing 328 of a three-pole switch mechanism 330 is clamped to one end of the governor casing, said mechanism including a pronged one-piece contact member 332, Figures 30 and 33, of resilient material, a prong 333 of said member being clamped at one of its ends to a pole or contact 334 secured within the housing 328. The pole is wired to the contact G of the switch 418, thus providing a so-called hot wire lead or input pole as disclosed in Figure 30. The other end of the prong 333 is normally in yieldable contact with a pole 335 secured within the housing 328, said pole being connected, by wiring and a clip 335', to the contact 88 and solenoid 110, all as disclosed in Figure 32. The prong 333, prongs 333' adjacent the prong 333 and the remaining parts of the one-piece contact member 332 are so preformed as to effect this contact. When the governor functions, as hereinafter described, an end portion 338' of the prongs moves downwardly into contact with a contact 336 mounted on a conductor bar 337. No claim to the switch 330 is made herein, inasmuch as the same and all of its essential elements or their equivalents are disclosed in Patent No. 1,960,020.

Describing now the operation of the governor and switch mechanism, when the speed of the vehicle exceeds, say, fifteen miles per hour, the sector plates 310 and 312 are moved outwardly, under the action of centrifugal force, to bend a yieldable member 338 secured to the weights by members 340. Members 340, which are angular in shape, are adjustably secured to the weights by screws 342 and 344, all as is disclosed in Figure 32. The member 338 moves into contact with a tab 346 secured to the multipronged contact member 332, said member being thereby flexed, as above described, to move its end away from contact with the pole 335 and into contact with the contact 336. The circuit necessary to operate the power means to place the transmission in high gear is thus made. At speeds under fifteen miles per hour, the input pole 334 of the governor switch is connected with the output pole 337' of the switch, which connects directly to the solenoid 110 controlling the establishment of second gear.

It may be noted at this juncture that when the selector switch 364 is in its G position a slot 363 in the contact member 360, which is filled with insulating material constituting a portion of the surface of the member 356, is in registry with the contact 382 of the switch. In this position, the solenoids 108 and 420 are deenergized. As will be apparent from an inspection of the circuits of Figure 2 and the switch mechanism 348, this slot is necessary in order to make possible the functioning of the interlock switch 168, the clutch operated switch 418, and a cooperating mechanism, or, in brief, to make operative the mechanism of Figure 2, which is added to the mechanism of Figure 1 to make possible an automatic operation of the transmission. From the above, it may be seen that after the G position of ratchet switch 418 is made the selection either of second or high gear depends wholly on the speed of the car; that is, if the clutch were disengaged at a speed under 15 M. P. H., no shift would be made and the car would continue to operate in second gear. If the clutch were disengaged at a speed greater than 15 M. P. H., the transmission would be operated and the car would then operate in third gear. When coming down from third to second, the operation is the same. With the above-described automatically operated mechanism, the transmission is left in second gear when the car is stopped; that is, when the switch 348 is left in its G position. However, with most of the present day transmissions, the car may be accelerated from a dead stop with the transmission in second gear, assuming, of course, that the load is sufficiently low and the engine torque sufficiently high to avoid a choking of the motor. A slipping clutch, effected by the aforementioned clutch operating mechanism, facilitates this operation.

It is to be particularly noted that at any time during automatic operation, if it is desirable to shift into a gear in the conventional manner, this may be done by moving the selector 402 out of its G position and into any one of the other positions in the H-shaped slot 404 disclosed in Figure 2. The operator is not limited to only one method of shifting at a time.

There is thus provided in one compact and simple mechanism power means for operating both the transmission and the clutch, the only manually operated controls being the accelerator and either the selector switch 162 or 348. The power means includes, as an accessory readily installed either on a new or on a used vehicle, a power unit including motors 42 and 46, said motors, together with the spring 300, constituting operating means for effecting a shift rail selecting operation of the shaft 53 and a shift rail actuating operation of said shaft. The manually operated selector switch 348, the governor controlled selector switch 430, the clutch pedal operated selector switch 418, the neutralizing switch 94, the interlock switch 168 and the valve unit 44 constitute means for controlling the operation of said power means. The driver may, at his option, either effect an automatic operation of the transmission as a function of accelerator operation and car speed or, by operation of the miniature shift lever 402, effect a manually controlled operation of the transmission in a manner closely simulating the corresponding operation of a standard transmission.

Although this invention has been described in connection with certain specific embodiments, the principles involved are susceptible of numerous other applications that will readily occur to persons skilled in the art. The invention is, therefore, to be limited only as indicated by the scope of the appended claims.

I claim:

1. In an automotive vehicle provided with a clutch and a changeable-speed transmission mechanism having a plurality of gear-changing elements, each movable in opposite directions to effect different gear changes, a gear-changing mechanism for said transmission mechanism comprising a rotatable shaft having an actuating member fixed thereon to rotate coaxially with said shaft, means for operatively connecting said actuating member to one or another of said gear-changing elements, operating means for rotating said actuating member to effect one or another gear change and to restore the mechanism to neutral, selecting means including a controlling member located exteriorly of and remote from the transmission mechanism for controlling the direction of movement of said actuating member and the connection of said actuating member to one or another gear-changing element, controlling means for said actuating member comprising a clutch operated progressive switch located exteriorly of the transmission mechanism, another selector switch operated by a vehicle speed responsive governor, and further comprising a plurality of switches operated by the means for connecting the actuating member to one or another of the gear-changing elements and by the operating means for rotating the actuating member, said controlling means being operative, in conjunction with said selecting means, to either automatically or at the will of the driver control the direction of movement of said actuating member to effect one or another gear change and to interrupt the movement of said actuated member when said member reaches a neutral position, and means also controlled by the disengagement of the clutch for rendering operative or inoperative said gear-changing mechanism.

2. In an automotive vehicle, a remotely controlled transmission operating power means for operating a change-speed transmission, said transmission including a plurality of gear-changing elements, each movable in opposite directions to effect different gear changes, a clutch for connecting said transmission to the automobile engine, said power means comprising a rotatable shaft having an actuating member fixed thereon to rotate coaxially therewith, means including a spring and a motor for operatively connecting said actuating member to one or another of said gear-changing elements, operating means including a pressure differential operated motor for rotating said actuating member to effect one or another gear change and to restore the mechanism to neutral, means for controlling the operations of said motor including selecting means comprising a controlling member located exteriorly of and remote from the transmission mechanism for controlling the gear-changing operations of said actuating member, means including a progressive switch operative, upon the disengagement of the clutch, for in part controlling the operation of said operating means, a plurality of switch units including a switch actuated by the power element of said pressure differential operated motor, said switches being operative, in conjunction with said selecting means, to control the direction and extent of movement of a gear-changing element by said actuating member to effect one or another gear change and to restore the mechanism to neutral.

3. In an automotive vehicle provided with a change-speed transmission having a plurality of shift rails, a clutch and an accelerator, power means controlled in part by the accelerator for operating the clutch, and remotely controlled power means for operating the transmission, said latter power means including a shift rail actuating member, means for selectively connecting said actuating member to one or another of said shift rails, operating means for moving said actuator to move the shift rail selected for operation, said operating means including a pressure differential operated motor operatively connected to said actuating member, valves for controlling the operation of said motor, electro-magnetic means for operating said valves, said transmission operating power means further including a selector switch having a plurality of contacts and a controlling contact unit, a manually operated control member for actuating said contact unit, a switch actuated by the means which connects the actuating member with one or the other of the rails, a switch actuated by the power element of the aforementioned motor, a progressive selector switch connected to the clutch and a governor controlled switch, conductors interconnecting said switches and the electro-magnetic valve operating means, said switches and valve means being operative, in conjunction with said selector switch and by movement of said actuating member, to control the direction and extent of movement of a gear-changing element by said actuating member in one or another direction to effect a gear change and to restore the mechanism to neutral.

4. In a mechanism for operating the selective transmission of an automotive vehicle, said transmission being provided with a plurality of gear-changing elements to be reciprocated, a rotatable actuating member, means for operatively connecting said member to one or another of said elements, and operating and controlling means for the actuating member to rotate it in one direction or another to either neutralize the transmission or establish the same in gear, said means comprising a power unit including a pressure differential operated motor the power element of which is connected to said actuating member, another pressure differential operated motor the power element of which is also connected to said actuating member, a neutralizing switch mounted adjacent the first-mentioned motor, means interconnecting the power element of said motor with said neutralizing switch, a control valve unit including a plurality of solenoids, a manually operated selector switch having a controlling contact unit, said switch being mounted within reach of the driver, a selector interlock switch mounted adjacent to and connected with the power element of the second-mentioned motor, another selector switch operably connected with the clutch of the vehicle, a governor operated switch, and a plurality of conductors interconnecting the manually operated selector switch, the valve operating solenoids, the neutralizing switch, the selector switch operably connected with the clutch, the selector interlock switch and the governor operated switch, said switches being so constructed and arranged and the conductors so interconnecting the switches and solenoids that upon moving the aforementioned controlling contact unit to one position the transmission operating and controlling means thereafter effects an automatic operation of the transmission upon operating the accelerator to effect an operation of the clutch, and upon moving the controlling contact unit to any one of a plurality of other positions the transmission operating and controlling means effects a setting of the transmission to establish the same in the desired gear ratio.

5. In an automotive vehicle provided with a clutch and a change-speed transmission having a plurality of gear-changing elements, each movable in a different direction to effect different gear changes, a gear-changing device for said change-speed transmission mechanism comprising a rotatable shaft having an actuating member fixed thereon to rotate coaxially therewith and having means for operatively connecting it to one or another of said gear-changing elements, operating means for rotating said actuating member in one or the other direction to actuate the element to which it is connected to effect one or another gear change and to restore the mechanism to neutral, said operating means including a power unit detachably mounted upon the casing of the transmission, manually operated and power operated means for controlling the power unit including a manually operated selector switch located exteriorly of and remote from the transmission mechanism for in part controlling the gear-changing operations of said power unit, and also including a governor operated selector switch and a selector switch operatively connected with the clutch, and other controlling means for said power unit comprising switch means including a neutralizing switch actuated by means interconnecting the switch with a power element of the aforementioned power unit, and further including an automatically operated selector interlock switch connected to and operable by a power element of the aforementioned power unit, said switches being operative, in conjunction with the aforementioned selector switches, to control the direction and extent of movement of a gear-changing element by said actuating member in one or another direction to effect a gear change and to restore the mechanism to neutral.

6. In an automotive vehicle provided with a clutch and a change-speed transmission having a plurality of shift rails and an actuating member movable to first select a rail and then movable to establish a desired gear relation, a power operated mechanism for operating the transmission comprising fluid power means for effecting the selecting movement of said actuating member, a separate fluid power means for effecting the shifting movement of said actuating member, a governor operated switch, a clutch operated selector switch, manually operable selector means operable to control the flow of fluid pressure to said first-named power means to effect the selecting movement of said actuating member and also operable to make possible an operation of the clutch operated selector switch and the governor operated switch, both of the latter switches being positioned exteriorly of both of said power means and operable, together with the manually operated selector means, for controlling the flow of fluid pressure to said second-named power means.

7. In an automotive vehicle provided with a clutch having clutch springs, an accelerator and a change-speed transmission having shift rails, pressure differential operated power means controlled by the accelerator for operating the clutch, and power means for operating the transmission including a shift rail actuating member, a motor connected to said actuating member and operative to move the same to effect a connection with one or another of the shift rails, a solenoid operated valve for controlling the operation of said motor, another motor connected to said actuating member and operative to move the selected rail to thereby establish the transmission in gear, a plurality of solenoid operated valves for controlling the operation of said latter motor, a plurality of switches for controlling the operation of the valve operating solenoids including a manually operated selector switch, two rotatable selector switches actuated by the power elements of the aforementioned motors, one of said switches being actuated by the first-mentioned motor and the other of said switches being actuated by the second-mentioned motor, a progressive selector switch actuated by the clutch springs and the aforementioned accelerator controlled power means, and a governor operated switch, said manually operated selector switch including a contact wired only to the first-mentioned rotatable selector switch, and further including other contacts wired to a plurality of the aforementioned valve operating solenoids and to the second-mentioned rotatable selector switch, and also including a governor contact wired to the clutch spring operated switch, said latter switch including a plurality of contacts directly wired to a plurality of the valve operating solenoids, and a contact wired to the governor operated switch, the latter switch including contacts wired to a plurality of the aforementioned valve operating solenoids.

8. In an automotive vehicle provided with a clutch, a gear-changing mechanism for a change-speed transmission of the vehicle having a plurality of gear-changing elements, each movable in opposite directions to effect different gear changes, said mechanism comprising a rotatable shaft having an actuating member fixed thereon to rotate coaxially therewith and having means for operatively connecting it to one or another of said gear-changing elements, a motor for rotating said shaft and the actuating member in one or the other direction to actuate the gear-changing element to which it is connected to effect one or another gear change and to restore the mechanism to neutral, means for controlling the operation of said aforementioned means and for controlling the operation of said motor to make possible either an automatic operation of the transmission or an operation thereof to effect a desired gear setting, said controlling means including a manually operated selector switch for in part controlling the operation of said motor and said aforementioned means, said switch being provided with a governor contact, a progressive selector switch operatively connected to the clutch of the vehicle, said switch being provided with a governor contact, a conductor interconnecting the governor contact of the manually operated selector switch and a contact of said progressive selector switch, a vehicle speed responsive governor, a selector switch connected to said governor, a conductor interconnecting said governor contact of the progressive selector switch and said governor, a plurality of valves for controlling the operation of the aforementioned motor, a solenoid for operating each of said valves, a plurality of conductors interconnecting the governor operated switch with the valve operating solenoids, and means, including switches wired to said solenoids and aforementioned switches, cooperating with said switches and solenoids to so control the valves as to insure a transmission neutralizing operation of said motor, after the transmission has been established in gear, before the motor may again be energized to establish the transmission in another gear ratio.

HAROLD W. PRICE.

CERTIFICATE OF CORRECTION.

Patent No. 2,218,136. October 15, 1940.

HAROLD W. PRICE.

It is hereby certified that error appears in the printed specification of the above numbered patent requiring correction as follows: Page 3, first column, line 61, for "Figure 6" read --Figure 26--; and second column, line 30, for "Figure 40;" read --Figure 40; and--; line 35, for "motor" read --rotor--; page 4, first column, line 41, for "element" read --elements--; lines 73 and 74, for "piston 56" read --piston 54--; page 5, first column, line 28, for "spider-lie" read --spider-like--; page 7, first column, line 75, strike out "with"; and that the said Letters Patent should be read with this correction therein that the same may conform to the record of the case in the Patent Office.

Signed and sealed this 16th day of December, A. D. 1941.

(Seal)

Henry Van Arsdale,
Acting Commissioner of Patents.